United States Patent Office 3,009,761
Patented Nov. 21, 1961

3,009,761
POLYQUATERNARY AMMONIUM COMPOUNDS
Carl Taube and Klaus Böckmann, Leverkusen-Bayerwerk, Germany, assignors to Farbenfabriken Bayer Aktiengesellschaft, Leverkusen, Germany, a corporation of Germany
No Drawing. Filed Jan. 16, 1958, Ser. No. 709,172
Claims priority, application Germany Jan. 19, 1957
5 Claims. (Cl. 8—74)

The present invention relates to polyquaternary ammonium compounds; more particularly it concerns polyquaternary ammonium compounds which are obtained by contacting di-tertiary ethylene diamines with polyquaternary ammonium compounds which are obtained by contacting di-tertiary ethylene diamines, for instance, 1,2-bis-(dimethyl-amino)-ethane, with aliphatic di-halogen compounds whose carbon chain is interrupted by a hetero atom or which contain not more than 4 carbon atmos in an uninterrupted carbon chain, for instance with 2,2'-dicholorodiethyl ether, N,N'-bis-(2-chlorethyl)-urea, 1,3-dibromopropane and in particular 1,4-dichlorobutane or 1,4-dibromobutane.

The application of the after-treatment agents is effected in conventional manner, preferably from aqueous solutions. The after-treatment agents may also be used in combination with metal compounds such as are used for the after-treatment of direct dyeings, for example with copper sulfate or water-soluble complex copper salts.

The quantities of after-treatment agents required may easily be established in each case by preliminary experiments.

Details are given in the following examples which serve to illustrate the invention without, however, limiting the scope thereof.

Example 1

A mixture of 11.6 grams of 1,2-bis-(dimethyl-amino)-ethane and 12.7 grams of 1,4-dichlorobutane is heated to 90–95° C. for about 40 hours. The reaction product thus formed is then dissolved in 50 millilitres of water and the solution is made up with water to a total weight of 140 grams after the addition of 30 grams of ammonium sulfate.

A dyeing on cotton produced with a dyestuff containing 3 percent of Benzolichtrot 8 BL (Schultz, Farbstofftabellen, 7th ed. (1931), No. 566) is after-treated at room temperature for ½ hour in a bath having a liquor-to-goods ratio of 20:1 and containing per litre 3 grams of the solution of the polyquaternary ammonium compound prepared. After this treatment the dyeing has outstanding wet fastness properties.

The wet fastness of the dyeing can likewise be outstandingly improved by using instead of the solution described above, a solution prepared by replacing 1,4-dichlorobutane by the equipment quantity of 1,4-dibromobutane.

We claim:
1. A process for improving the wet fastness of a cellulosic fiber dyed with a substantive dyestuff which comprises applying to said dyed fiber an aqueous solution consisting essentially of a quaternary polyalkylene polyamine of the formula

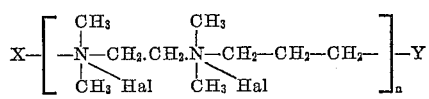

wherein X is selected from the group consisting of
$ClCH_2CH_2CH_2$
and

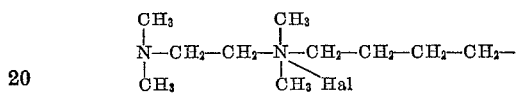

and Y is selected from the group consisting of Cl and

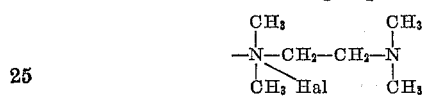

Hal stands for halogen and n is a number between 4 and 29.

2. Process of claim 1 wherein the quaternary polyalkylene polyamine applied is obtained by contacting 1,2-bis-(dimethyl-amino)-ethane with a member of the group consisting of 1,4-dichlorobutane and 1,4-dibromobutane in the absence of solvents at a temperature between 90 and 95° C. for about 40 hours.

3. Process of claim 1 wherein the process is conducted in the presence of a water-soluble sulfate.

4. Process of claim 2 wherein the process is conducted in the presence of a copper sulfate.

5. Process of claim 2 wherein the process is conducted in the presence of ammonium sulfate.

References Cited in the file of this patent
UNITED STATES PATENTS

| | | |
|---|---|---|
| 2,261,002 | Ritter | Oct. 28, 1941 |
| 2,767,176 | Erickson | Oct. 16, 1956 |
| 2,807,910 | Erickson | Oct. 1, 1957 |

FOREIGN PATENTS

| | | |
|---|---|---|
| 702,695 | Great Britain | Jan. 20, 1954 |

OTHER REFERENCES

Gill: J.S.D.C., vol. 71, pp. 380–388, July 1955 (esp. p. 382).

Khanna et al.: Chem. Abstracts, vol. 49, pages 1725–1726 (1955).